(12) United States Patent
Callicoat et al.

(10) Patent No.: US 10,297,807 B2
(45) Date of Patent: *May 21, 2019

(54) BUS BAR LOCATING FEATURE AND METHOD

(71) Applicant: FORD GLOBAL TECHNOLOGIES, LLC, Dearborn, MI (US)

(72) Inventors: Debbi Callicoat, Livonia, MI (US); Brian Utley, Canton, MI (US); Steve Droste, Dearborn, MI (US); Derek Hartl, Royal Oak, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 257 days.

This patent is subject to a terminal disclaimer.

(21) Appl. No.: 15/274,286

(22) Filed: Sep. 23, 2016

(65) Prior Publication Data

US 2017/0012270 A1    Jan. 12, 2017

Related U.S. Application Data

(63) Continuation of application No. 14/059,481, filed on Oct. 22, 2013, now Pat. No. 9,478,788.

(51) Int. Cl.
*H01M 2/20* (2006.01)
*H01M 2/30* (2006.01)

(52) U.S. Cl.
CPC .......... *H01M 2/206* (2013.01); *H01M 2/305* (2013.01); *H01M 2220/20* (2013.01); *Y10T 29/49108* (2015.01)

(58) Field of Classification Search
CPC ............ H01M 2/02; H01M 2/10; H01M 2/20; H01M 2/30
See application file for complete search history.

(56) References Cited

U.S. PATENT DOCUMENTS

| | | |
|---|---|---|
| 6,365,297 B1 | 4/2002 | Wolczak et al. |
| 8,076,020 B2 | 12/2011 | Goto et al. |
| 8,257,855 B2 | 9/2012 | Ijaz et al. |
| 2006/0088761 A1* | 4/2006 | Ota ........................ H01M 2/18 429/130 |
| 2006/0178051 A1 | 8/2006 | Hashida et al. |
| 2007/0141459 A1 | 6/2007 | Goto et al. |
| 2007/0196732 A1 | 8/2007 | Tatebayashi et al. |
| 2009/0075163 A1 | 3/2009 | Shevock et al. |

(Continued)

FOREIGN PATENT DOCUMENTS

EP    0967700 A1    12/1999

OTHER PUBLICATIONS eTec, Garrett P. Beauregard, "Report on Investigation: Hybrids Plus Plug in Hybrid Electric Vehicle," prepared for National Rural Electric Cooperative Association, Inc. and U.S. Department of Enegy, Idaho National Laboratory, Jun. 26, 2008, Revision 1.

*Primary Examiner* — Kenneth J Douyette
(74) *Attorney, Agent, or Firm* — Carlson, Gaskey & Olds

(57) ABSTRACT

A battery assembly according to an exemplary aspect of the present disclosure includes, among other things, a terminal holder, a terminal at least partially surrounded by the terminal holder, and a bus bar module connectable to the terminal holder. One of the terminal holder and the bus bar module includes at least one locating feature to position the bus bar module in a welding position relative to the terminal.

18 Claims, 4 Drawing Sheets

(56) References Cited

U.S. PATENT DOCUMENTS

| | | | |
|---|---|---|---|
| 2010/0190050 A1* | 7/2010 | Ochi | H01M 2/1077 |
| | | | 429/160 |
| 2010/0247999 A1 | 9/2010 | Ijaz et al. | |
| 2011/0111649 A1* | 5/2011 | Garascia | H01M 2/1077 |
| | | | 439/890 |
| 2012/0019061 A1 | 1/2012 | Nishihara et al. | |
| 2012/0305283 A1 | 12/2012 | Kalayjian et al. | |

\* cited by examiner

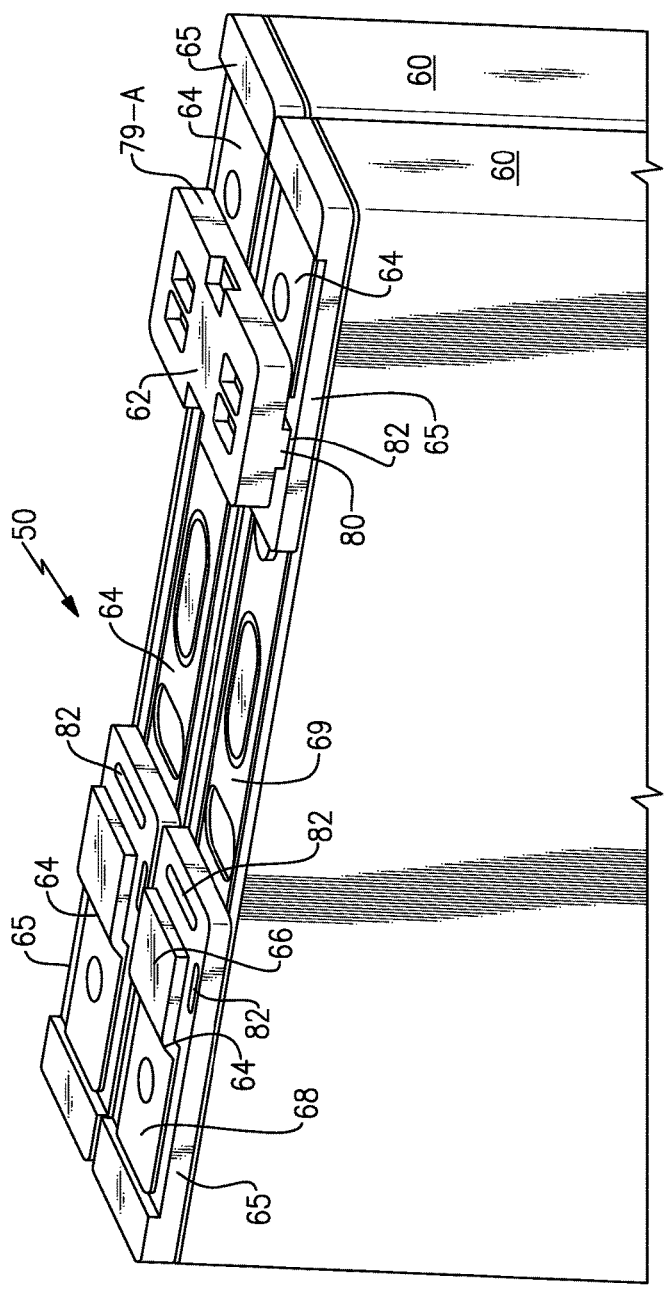

BUS BAR LOCATING FEATURE AND METHOD

CROSS-REFERENCE TO RELATED APPLICATIONS

This is a continuation of U.S. patent application Ser. No. 14/059,481, which was filed on Oct. 22, 2013 and is now U.S. Pat. No. 9,478,788.

TECHNICAL FIELD

This disclosure relates to an electrified vehicle, and more particularly, but not exclusively, to electrically connecting bus bars to terminals of a battery assembly of the electrified vehicle.

BACKGROUND

Hybrid electric vehicles (HEV's), plug-in hybrid electric vehicles (PHEV's), battery electric vehicles (BEV's), fuel cell vehicles and other known electrified vehicles differ from conventional motor vehicles in that are powered by one or more electric machines (i.e., electric motors and/or generators) instead of or in addition to an internal combustion engine. High voltage current is typically supplied by one or more battery assemblies that store electrical power for powering the electric machine(s).

Electrified vehicle battery assemblies include one or more battery cells that are configured in a series or series-parallel string in order to obtain the voltage and power levels that are necessary to drive the electrified vehicle. The battery cells must be reliably connected to one another in order to achieve these voltage and power levels. Bus bars may be used to electrically connect the battery cells of a battery assembly. The bus bars are commonly located and secured to the terminals of the battery cells via a bolted joint.

SUMMARY

A battery assembly according to an exemplary aspect of the present disclosure includes, among other things, a terminal holder, a terminal at least partially surrounded by the terminal holder, and a bus bar module connectable to the terminal holder. One of the terminal holder and the bus bar module includes at least one locating feature to position the bus bar module in a welding position relative to the terminal.

In a further non-limiting embodiment of the foregoing battery assembly, the at least one locating feature includes a pin structure.

In a further non-limiting embodiment of either of the foregoing battery assemblies, the pin structure is received within an opening of the other of the terminal holder and the bus bar module.

In a further non-limiting embodiment of any of the foregoing battery assemblies, the at least one locating feature extends from the terminal holder.

In a further non-limiting embodiment of any of the foregoing battery assemblies, the at least one locating feature extends from the bus bar module.

In a further non-limiting embodiment of any of the foregoing battery assemblies, the at least one locating feature includes a plurality of clips configured to snap into openings of the other of the terminal holder and the bus bar module.

In a further non-limiting embodiment of any of the foregoing battery assemblies, the bus bar module includes a housing and a bus bar.

In a further non-limiting embodiment of any of the foregoing battery assemblies, at least one tab is configured to retain the bus bar relative to the housing.

In a further non-limiting embodiment of any of the foregoing battery assemblies, the terminal includes a landing that contacts the bus bar module and a base in contact with the terminal holder.

In a further non-limiting embodiment of any of the foregoing battery assemblies, the landing extends along a first plane and the base extends along a second plane that is spaced from the first plane.

A battery assembly according to an exemplary aspect of the present disclosure includes, among other things, a terminal holder and a bus bar module configured to attach to the terminal holder. One of the terminal holder and the bus bar module includes a locating feature and the other of the terminal holder and the bus bar module includes an opening configured to receive the locating feature.

In a further non-limiting embodiment of the foregoing battery assembly, a terminal extends at least partially between the terminal holder and the bus bar module.

In a further non-limiting embodiment of either of the foregoing battery assemblies, the terminal includes a landing that extends along a first plane and a base that extends along a second plane that is spaced from the first plane.

In a further non-limiting embodiment of any of the foregoing battery assemblies, the locating feature includes a pin structure that extends from the terminal holder.

In a further non-limiting embodiment of any of the foregoing battery assemblies, the locating feature includes a clip that extends from the bus bar module.

A method according to another exemplary aspect of the present disclosure includes, among other things, locating a bus bar module relative to a terminal of a battery assembly, connecting the bus bar module to a terminal holder and welding the bus bar module to the terminal after the connecting step.

In a further non-limiting embodiment of the foregoing method, the step of locating includes inserting a pin structure of one of the terminal holder and the bus bar module into an opening in the other of the terminal holder and the bus bar module.

In a further non-limiting embodiment of either of the foregoing methods, the step of locating includes inserting a clip of one of the terminal holder and the bus bar module into an opening in the other of the terminal holder and the bus bar module.

In a further non-limiting embodiment of any of the foregoing methods, the step of connecting includes snapping the bus bar module onto the terminal holder.

In a further non-limiting embodiment of any of the foregoing methods, the step of welding includes positioning a weld tool relative to a window of the bus bar module and using the weld tool to weld a bus bar of the bus bar module to the terminal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates a battery assembly that can be incorporated into an electrified vehicle.

FIG. 3 illustrates an exemplary terminal of a battery cell.

DETAILED DESCRIPTION

This disclosure relates to a locating feature and method for locating a bus bar module relative to a terminal of a battery cell of an electrified vehicle battery assembly. The locating feature may be incorporated into either a bus bar module or a terminal holder and is configured to both laterally and vertically locate the bus bar module at a proper position relative to the terminal. Once located, a bus bar of the bus bar module can be welded to the terminal to electrically connect the battery cells of the battery assembly. These and other features are discussed in greater detail herein.

Figure 1:
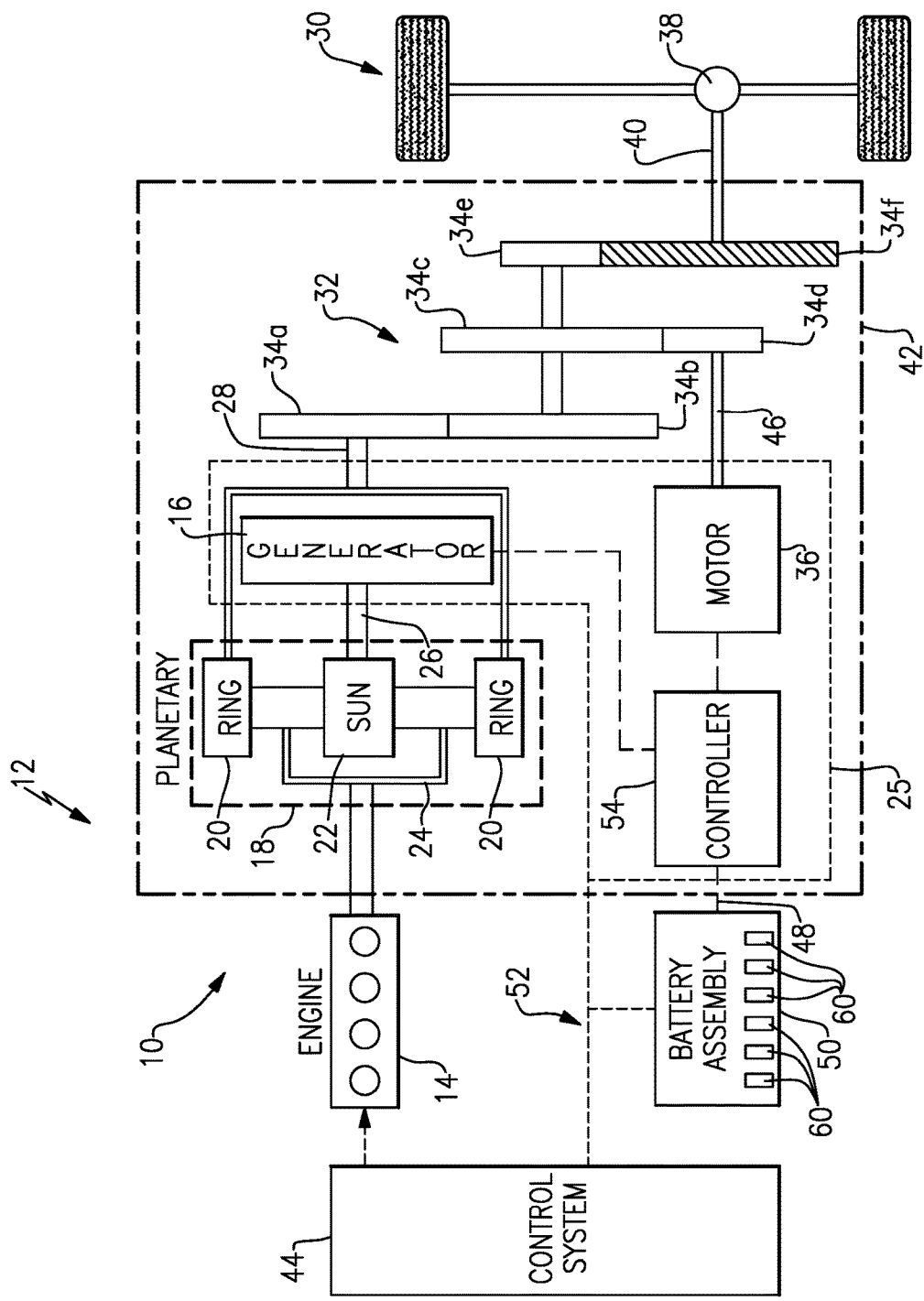
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, and fuel cell vehicles.

In one embodiment, the powertrain 10 is a powersplit system that employs a first drive system that includes a combination of an engine 14 and a generator 16 (i.e., a first electric machine) and a second drive system that includes at least a motor 36 (i.e., a second electric machine), the generator 16 and a battery assembly 50. For example, the motor 36, the generator 16 and the battery assembly 50 may make up an electric drive system 25 of the powertrain 10. The first and second drive systems generate torque to drive one or more sets of vehicle drive wheels 30 of the electrified vehicle 12, as discussed in greater detail below.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery assembly 50. The battery assembly 50 may be a high voltage battery that is capable of outputting electrical power to operate the motor 36 and the generator 16. Other types of energy storage devices and/or output devices can also be incorporated for use with the electrified vehicle 12.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the battery assembly 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

The battery assembly 50 is an exemplary energy storage device for use with the electrified vehicle 12. The battery assembly 50 may be a high voltage battery that is capable of outputting electrical power to operate the motor 36 and/or the generator 16. Other types of energy storage devices and/or outputting devices can also be used with the electrified vehicle 12. The battery assembly 50 may include one or more battery cells 60 (shown schematically in FIG. 1), such as lithium-ion battery cells. The battery cells 60 must be electrically coupled to one another in order to drive the motor 36 and/or generator 16. Exemplary bus bar modules for electrically connecting the battery cells 60 are described in greater detail below.

FIG. 2 illustrates an exemplary battery assembly 50 that may include two or more battery cells 60 that store power for driving the electric machines 16, 36 of the electrified vehicle 12 (see FIG. 1). In this embodiment, the battery assembly 50 is shown with two battery cells. However, the battery assembly 50 could include any number of battery cells 60 within the scope of this disclosure. The number of battery cells 60 could depend on the energy requirements of the loads being powered by the battery assembly 50, among other design criteria.

Each battery cell 60 may include two terminals 64 that extend from a surface 69 of the battery cell 60. A terminal holder 65 generally surrounds each terminal 64. In one non-limiting embodiment, one terminal holder 65 extends about a perimeter of each terminal 64. The terminal holders 65 are attached to the surface 69 and may support, protect, and/or isolate the terminals 64.

A bus bar module 62 may be employed to electrically connect the battery cells 60 of the battery assembly 50. In one embodiment, the bus bar module 62 connects to one or more terminal holders 65 to locate and secure the bus bar module 62 relative to the terminals 64 of the battery cells 60.

In one non-limiting embodiment, the terminals 64 are made of a metallic conductive material and the bus bar module 62 and terminal holders 65 include a polymeric material. Other materials may also be used within the scope of this disclosure.

FIG. 3 illustrates an exemplary terminal 64 that can be incorporated into a battery cell 60 of the battery assembly 50. In this embodiment, the terminal 64 includes a "diving board" shape. For example, the exemplary terminal 64 may include a landing 66 and a base 68. A connector 70 joins the landing 66 to the base 68. In one embodiment, the connector 70 is slightly curved to join the landing 66 to the base 68. The landing 66 of the terminal 64 may be secured to the bus bar module 62 and may hover above the terminal holder 65, whereas the base 68 of the terminal 64 may be secured directly to the terminal holder 65 (see left hand side of FIG. 2).

In one non-limiting embodiment, the landing 66 extends along a first plane P1 and the base 68 extends along a second plane P2. The first plane P1 may be spaced by a distance D from the second plane P2. In other words, the landing 66 may be slightly elevated relative to the base 68.

Figure 4:
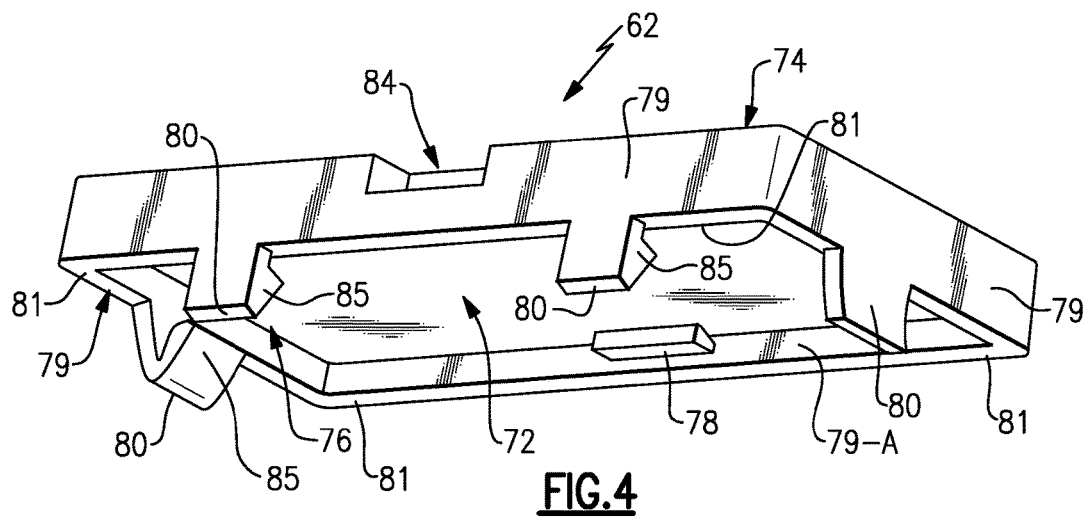
FIG. 4 illustrates an exemplary bus bar module.

FIG. 4 illustrates an exemplary bus bar module 62 that may be employed to electrically connect adjacent battery cells 60 of a battery assembly 50 (see FIG. 2). The bus bar module 62 may include a bus bar 72 and a housing 74. The bus bar 72 may be made of a metallic, conductive material similar (or dissimilar) to that of the terminals 64 (see FIG. 3), whereas the housing 74 may be constructed of a polymeric material.

In one embodiment, the bus bar 72 is held against an inner surface 76 of the housing 74 by one or more tabs 78. The tabs 78 may protrude from sidewalls 79 of the housing 74 and extend in a direction toward an opposite sidewall 79. Any number and configuration of tabs may be provided to retain the bus bar 72 relative to the housing 74.

The bus bar module 62 may additionally include one or more locating features 80 for locating the bus bar module 62 in a welding position relative to a terminal. For example, it may be desirable to locate the bus bar module 62 in a position appropriate for welding the bus bar 72 to terminals 64 to electrically connect battery cells 60 of a battery assembly 50 (see FIG. 2).

In one non-limiting embodiment, the bus bar module 62 includes a plurality of locating features 80 that extend inwardly from a bottom surface 81 of the sidewalls 79 of the housing 74. Any number of locating features 80 could be designed as part of the housing 74. The locating features 80 may be tabs, clips or other features that are configured to snap or connect to corresponding openings 82 formed in the terminal holders 65 (see FIG. 2). Of course, an opposite configuration is contemplated in which the locating features are formed as part of the terminal holders 65 and the openings are formed in the bus bar module 62 (see, for example, FIG. 7).

In one non-limiting embodiment, the locating features 80 include ledges 85. The ledges 85 may be received through openings 82 of the terminal holder 65 and may then abut a surface of the terminal holder 65 (see FIGS. 2 and 5) to provide a snap fit connection between the bus bar module 62 and the terminal holder 65.

At least one sidewall (here, the sidewall 79-A) of the housing 74 may exclude any locating features 80. Once connected and in the welding position, the sidewall 79-A of the bus bar module 62 is located above the terminal(s) 64 and therefore does not require any feature for mating with the terminal holder 65 (see FIG. 2).

The housing 74 of the bus bar module 62 may additionally include one or more windows 84. As discussed in greater detail below, the windows 84 can accommodate a weld tool for welding the bus bar 72 to the terminal(s) 64 once the bus bar module 62 is properly located and positioned in a welding position.

Figure 5:
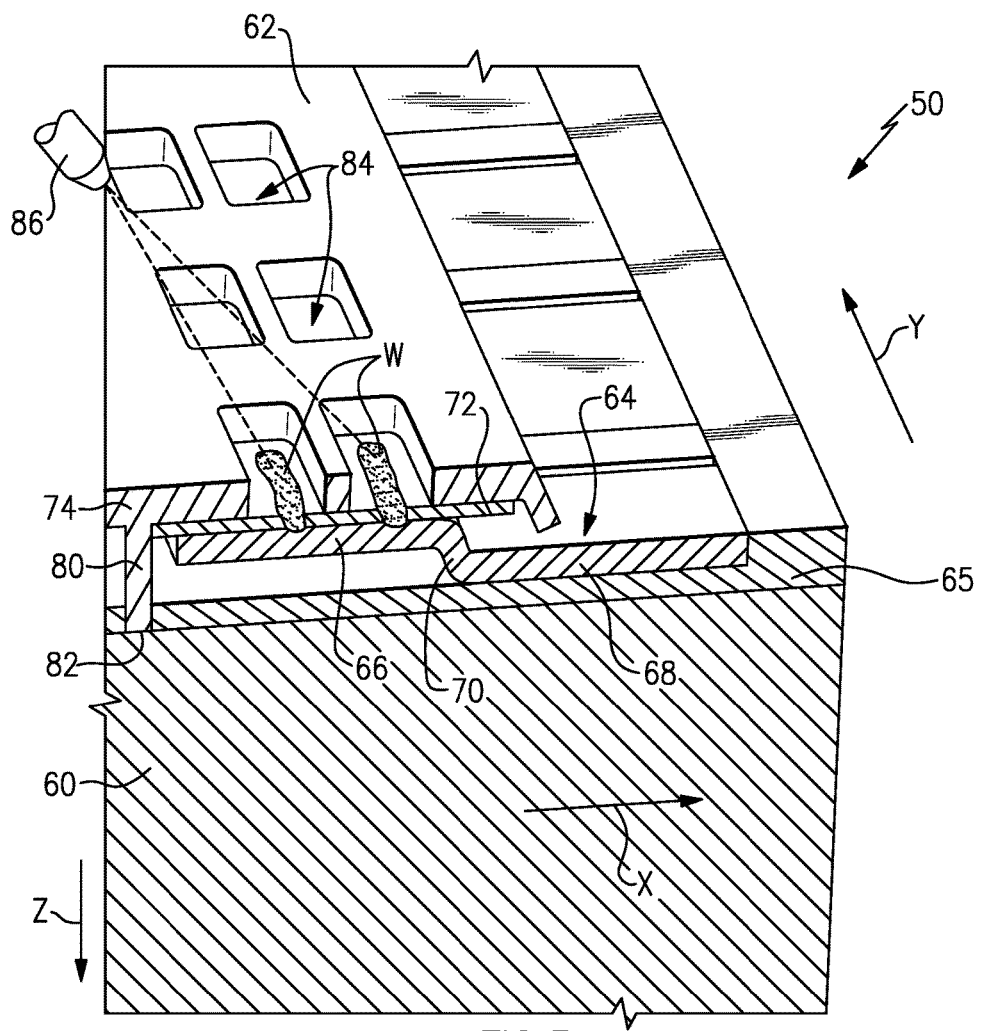
FIG. 5 illustrates a method for electrically connecting battery cells of a battery assembly with a bus bar module.

FIG. 5, with continued reference to FIGS. 1-4, schematically illustrates a method for electrically connecting battery cells 60 of a battery assembly 50 with a bus bar module 62. A bus bar module 62 is first located in a welding position relative to a terminal 64 of a battery cell 60 via the locating features 80. For example, the locating features 80 of the housing 74 of the bus bar module 62 may be aligned and positioned directly over the openings 82 of the terminal holder 65.

Figure 6:
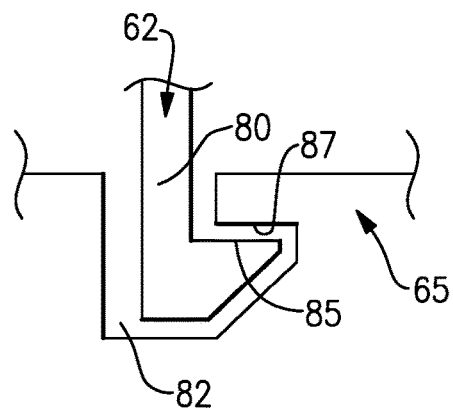
FIG. 6 illustrates a locating feature for locating a bus bar module relative to a battery terminal.

Next, once the locating features 80 are positioned relative to the openings 82, the bus bar module 62 may be secured relative to the terminal holder 65. In one non-limiting embodiment, the locating features 80 are configured as clips and the bus bar module 62 is snap fit onto the terminal holder 65. Once connected, the ledges 85 of the locating features 80 may abut against a surface 87 that surrounds the openings 82 of the terminal holder 65 to retain the bus bar module 62 to the terminal holder 65 (see FIG. 6). The bus bar module 62 is secured in a welding position once connected to the terminal holder 65 and is properly located in each of an X direction (a first lateral direction), a Y direction (a second lateral direction) and a Z direction (a vertical direction) by the locating features 80. In other words, the locating features 80 both laterally and vertically locate the bus bar module 62 at a proper position relative to the terminal(s) 64.

Once positioned in the welding position, the bus bar 72 of the bus bar module 62 may be welded to one or more terminals 64. In one embodiment, a weld tool 86 is positioned relative to the windows 84 of the housing 74 of the bus bar module 62 and may be used to weld the bus bar 72 directly to the landing 66 of the terminal 64 at welds W. The landing 66 may be flat or planar in order to facilitate receiving the welds W. The exemplary welds W may be laser welded lap joints, ultrasonic welds, resistance welds, etc. The welding process fuses the bus bar 72 to a portion of the terminal 64 in order to electrically connect adjacent battery cells 60. Several separate welds W may be used to secure the bus bar 72 to the terminal 64.

Figure 7:
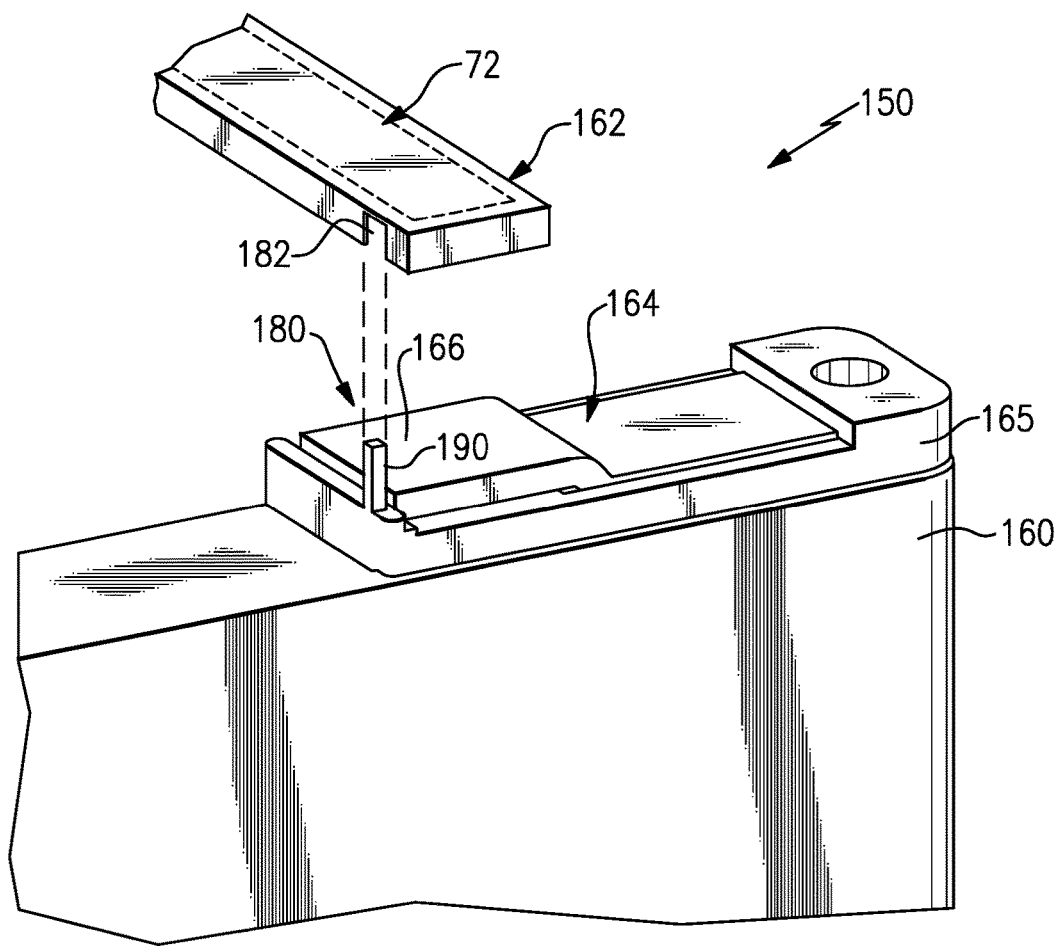
FIG. 7 illustrates another exemplary battery assembly.

Another exemplary battery assembly 150 is illustrated in FIG. 7. In this disclosure, like reference numbers designate like elements where appropriate and reference numerals with the addition of 100 or multiples thereof designate modified elements that are understood to incorporate the same features and benefits of the corresponding original elements.

In this alternative embodiment, a locating feature 180 extends from a terminal holder 165 rather than a bus bar module 162 of the battery assembly 150. The locating feature 180 may be received by an opening 182 formed in the bus bar module 162 to secure the bus bar module 162 to the terminal holder 165. In one non-limiting embodiment, the locating feature 180 includes a pin structure 190. The pin structure 190 can have a round cross-section, a rectangular cross-section, a tapering cross-section, etc. The pin structure 190 limits lateral movement of the bus bar module 162 relative to a terminal 164 of the battery cell 160. Once the pin structure 190 is received by the opening 182, a landing 166 of the terminal 164 can be welded to the bus bar 72 of the bus bar module 162 in a manner similar to that shown in FIG. 5.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
   a battery cell;
   a terminal of said battery cell including a base, a landing, and a curved connector joining said base to said landing;
   a terminal holder receiving said terminal;
   a bus bar module configured to attach to said terminal holder; and
   one of said terminal holder or said bus bar module includes a locating feature and the other of said terminal holder or said bus bar module includes an opening configured to receive said locating feature.

2. The battery assembly as recited in claim 1, wherein said terminal extends at least partially between said terminal holder and said bus bar module.

3. The battery assembly as recited in claim 1, wherein said landing extends along a first plane and said base extends along a second plane that is spaced from said first plane.

4. The battery assembly as recited in claim 1, wherein said locating feature includes a pin structure that extends from said terminal holder.

5. The battery assembly as recited in claim 1, wherein said locating feature includes a clip that extends from said bus bar module.

6. The battery assembly as recited in claim 1, wherein said terminal is diving board shaped.

7. The battery assembly as recited in claim 1, wherein said bus bar module includes a housing and a bus bar retained to said housing.

8. The battery assembly as recited in claim 7, wherein said housing is made of a polymeric material and said bus bar is made of a metallic material.

9. The battery assembly as recited in claim 7, wherein said housing includes a plurality of windows sized to expose said bus bar to a weld tool.

10. The battery assembly as recited in claim 1, wherein said locating feature is adapted to position said bus bar module in a welding position relative to said terminal.

11. The battery assembly as recited in claim 1, wherein said base is secured directly to said terminal holder and said landing hovers above said terminal holder at a location outside of said battery cell.

12. The battery assembly as recited in claim 1, comprising a weld joint that secures said landing of said terminal to a bus bar of said bus bar module.

13. The battery assembly as recited in claim 1, wherein said bus bar module includes a polymeric housing and a metallic bus bar retained against an inner surface of said polymeric housing by a tab that protrudes from said polymeric housing.

14. A battery assembly, comprising:
   a battery cell including a terminal mounted to an external surface of said battery cell and a terminal holder circumscribing said terminal and mounted to said external surface;
   a bus bar module snap fit onto said terminal holder and including a housing and a bus bar retained to said housing; and
   a window of said housing exposing a portion of said bus bar,
   wherein said terminal includes a base secured directly to said terminal holder, a landing that hovers above said terminal holder, and a curved connector joining said base to said landing.

15. The battery assembly as recited in claim 14, wherein one of said terminal holder and said bus bar module includes a locating feature and the other of said terminal holder and said bus bar module includes an opening configured to receive said locating feature.

16. The battery assembly as recited in claim 15, wherein said locating feature is adapted to position said bus bar module in a welding position relative to said terminal.

17. The battery assembly as recited in claim 14, wherein said window exposes said bus bar to a weld tool.

18. The battery assembly as recited in claim 14, wherein said terminal extends along a first axis that is parallel to a longitudinal axis of said battery cell, and said bus bar module extends along a second axis that is transverse to said first axis and said longitudinal axis.

* * * * *